US007767893B2

(12) United States Patent
Hansel et al.

(10) Patent No.: US 7,767,893 B2
(45) Date of Patent: Aug. 3, 2010

(54) METHOD OF OPERATING ONE OR MORE INDIVIDUAL ENTERTAINMENT DISPLAY DEVICES SUPPORTED BY SPECTATORS AT A SPECTATOR EVENT AND AN INDIVIDUAL ENTERTAINMENT DISPLAY DEVICE THEREFOR

(75) Inventors: Simon Hansel, Schwerte (DE); Thomas Stienen, Unna (DE)

(73) Assignee: Eventis GmbH, Schwerte (DE)

(*) Notice: Subject to any disclaimer, the term of this patent is extended or adjusted under 35 U.S.C. 154(b) by 1062 days.

(21) Appl. No.: 11/375,367

(22) Filed: Mar. 14, 2006

(65) Prior Publication Data

US 2006/0268538 A1 Nov. 30, 2006

Related U.S. Application Data

(63) Continuation-in-part of application No. PCT/EP2004/009664, filed on Aug. 30, 2004.

(30) Foreign Application Priority Data

Sep. 15, 2003 (DE) ................................ 103 42 595

(51) Int. Cl.
*H04M 3/00* (2006.01)
*H04M 3/42* (2006.01)
*H04M 1/00* (2006.01)
*H04Q 1/30* (2006.01)
*H04Q 5/00* (2006.01)

(52) U.S. Cl. ..................... 84/464 R; 340/7.1; 340/7.63; 340/7.55; 362/108; 455/3.06; 455/550.1

(58) Field of Classification Search ............... 84/464 R, 84/464 A, 477 R; 340/7.1, 7.2, 7.21, 7.26, 340/7.28, 7.51–7.63, 321, 323 R, 825.49; 362/84, 103–108; 472/57, 75; 297/188.01–188.21, 297/243; 455/2.01, 3.01–3.06, 344, 414.1, 455/456.1–457, 517, 518, 556.1, 556.566, 455/2, 90.1–90.3, 550.1; 725/74, 77
See application file for complete search history.

(56) References Cited

U.S. PATENT DOCUMENTS

| | | | | |
|---|---|---|---|---|
| 5,433,359 | A * | 7/1995 | Flowers ....................... | 224/222 |
| 5,461,188 | A | 10/1995 | Drago et al. | |
| 6,230,123 | B1 * | 5/2001 | Mekuria et al. ............. | 704/226 |
| 6,270,229 | B1 | 8/2001 | Chien | |
| 2003/0017823 | A1 * | 1/2003 | Mager et al. ................ | 455/566 |

FOREIGN PATENT DOCUMENTS

| | | | |
|---|---|---|---|
| DE | 29604706 | U1 | 2/1997 |
| DE | 29717897 | U1 | 1/1998 |
| DE | 19710114 | A1 | 10/1998 |
| DE | 19906275 | A1 | 8/2000 |
| DE | 20101380 | U1 | 8/2001 |
| DE | 20206577 | U1 | 8/2002 |

* cited by examiner

*Primary Examiner*—Jeffrey Donels
*Assistant Examiner*—Andrew R Millikin
(74) *Attorney, Agent, or Firm*—Nils H. Ljungman & Associates

(57) ABSTRACT

An individual entertainment display device which can produce lights and sounds as part of an entertainment presentation, and can be used individually or as part of a coordinated entertainment presentation with other display devices.

20 Claims, 13 Drawing Sheets

METHOD OF OPERATING ONE OR MORE INDIVIDUAL ENTERTAINMENT DISPLAY DEVICES SUPPORTED BY SPECTATORS AT A SPECTATOR EVENT AND AN INDIVIDUAL ENTERTAINMENT DISPLAY DEVICE THEREFOR

CONTINUING APPLICATION DATA

This application is a Continuation-In-Part application of International Patent Application No. PCT/EP2004/009664, filed on Aug. 30, 2004, which claims priority from Federal Republic of Germany Patent Application No. 103 42 595.0, filed on Sep. 15, 2003. International Patent Application No. PCT/EP2004/009664 was pending as of the filing date of this application. The United States was an elected state in International Patent Application No. PCT/EP2004/009664.

BACKGROUND

1. Technical Field

This application relates to a method of operating one or more individual entertainment display devices supported by spectators at a spectator event and an individual entertainment display device therefor. Generally, the method and device therefor are used to enhance the overall experience of a spectator at a spectator event, such as sporting events, music concerts, theatrical events, or other large public events.

2. Background Information

This application discloses a device that emits light and/or audio signals which, by suitable effects, increase and enhance the quality of life and the intensity of the experience of group processes, in particular for participants in major events.

Suitable major events themselves can also be enriched and made unforgettable by the use of the device according to at least one possible embodiment. Particularly suitable events include, for example, opera and theater performances, art exhibitions, podium discussions and literary readings.

The use of such a device is also conceivable at sporting events such as football games for example, as well as at events such as rock concerts etc.

A similar device of the prior art is described in DE 197 10 114, for example. In this device of the prior art, optical fibers are used to conduct the light from a battery-operated light source to a mounting device, where the light is emitted from the ends of the optical fibers and in connection with the artistically designed mounting device is intended to achieve an effective appearance.

The prior art includes another device of the type described in DE 29 60 4706, for example, in which a tuft or brush consisting of optical fibers is illuminated at its lower end by a battery-operated light source. This device also has a color changing device, which is provided with a multi-colored color wheel that is provided with an eccentrically located weight, whereby when the user's body moves, a device of this type is moved by the dynamic effect of the weight and thus causes a change in the color of the light emitted.

The prior art also includes a device of the type described in DE 202 06 577. In this device, a transparent presentation surface provided with a logo is located in a housing, whereby inside said housing there is a light source that illuminates the presentation surface or the logo from behind.

DE 297 17 897 describes a cap or hat with a device for the emission of electrically generated lighted signs. In this device, technical devices for the emission of lighted signs are attached by means of pins to a continuous, sewn-in plastic band on the cap. Fastened to the front side of the cap or hat are continuous white lighting means, and lighting means that light up in at least one color are attached to the back side.

For the sake of completeness, two devices are described below that relate to the emission of light (signals), although they relate only to a limited extent to the content of this invention.

These inventions are first a device of the type described in DE 199 06 275. This publication describes a warning light that is equipped with light-emitting diodes and generates a blinking light, whereby this warning light is realized in the form of a cap or hat.

The second device was presented in DE 201 01 380. This device is a lamp for a lighted helmet with an improved light emission and ease of handling.

All the devices of the prior art discussed above relate to the emission of lighted signs, of course, although because of their simple construction and the resulting limited capabilities they are not capable of achieving the results that are the object of at least one embodiment of the invention, such as the enhancement of the intensity of the experience of group processes.

OBJECT OR OBJECTS

At least one object of at least one embodiment described herein is to create a device which, on account of its characteristics, is capable of achieving the objectives described above. To do that, this application teaches that the emission of light signals, which, in the context of a major event, are to be emitted not only by a single module, but by a plurality of modules as described herein, are to be manually controlled and/or self-synchronizing and/or remotely controlled.

At least one possible embodiment is described in greater detail below on the basis of the exemplary embodiments illustrated in the accompanying drawings.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

DESCRIPTION OF EMBODIMENT OR EMBODIMENTS

Developments, advantages and potential applications of at least one possible embodiment are described in greater detail below with reference to the exemplary embodiments and the accompanying drawings. All the features of the embodiments either described and/or illustrated are the objects of this application, individually or in any desired combination, regardless of their placement in the claims or the references between the claims. The text of the claims is also incorporated by reference into the text of the description.

Figure 1:
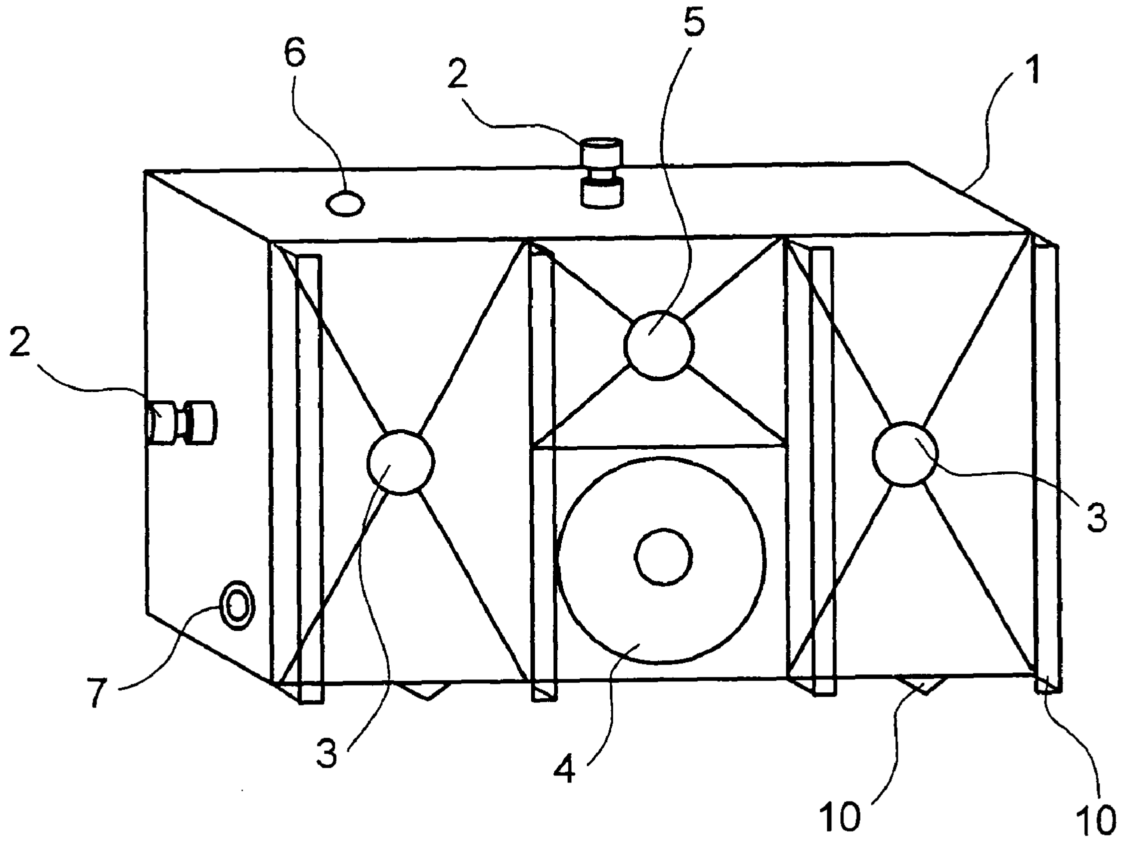
FIG. 1 is a simplified schematic diagram of one configuration of the module.
Figure 2:
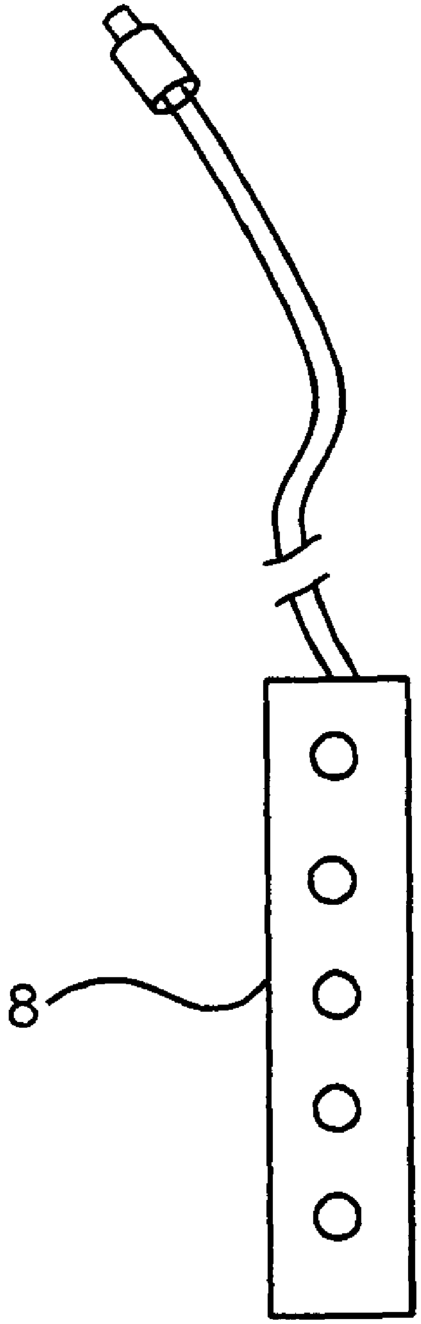
FIG. 2 is a schematic diagram of a manual control element.

As illustrated by way of example in FIG. 1, the module or the device has a housing 1. This housing 1 contains and/or comprises an energy source (not shown), at least one fastening device 2, at least one light source 3, at least one flashing light 5, at least one microphone 6, at least one connection 7 for a manual control element 8, at least one fastening device 10 for color filter elements and an electrical or electronic control unit 9 (not shown).

The device can also contain a loudspeaker 4.

One or more of the components listed above can also be omitted in a concrete realization without thereby going beyond the scope of the embodiments described herein.

Figure 3A:
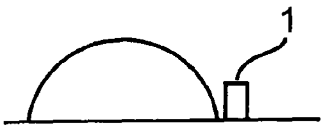
FIG. 3 illustrates several possible means of fastening and/or attaching the module.
Figure 3B:
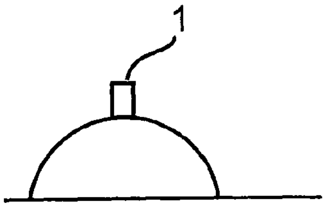
Figure 3C:
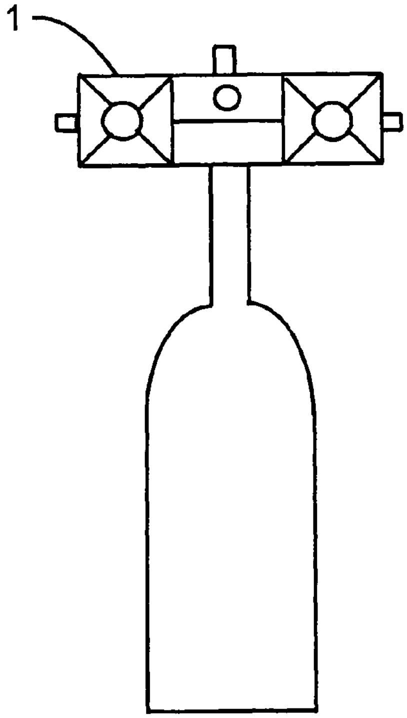
Figure 3D:
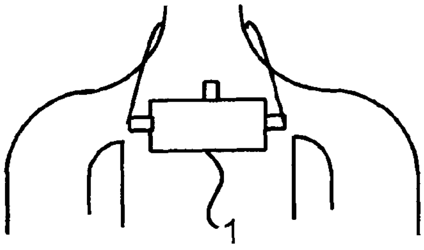

The fastening devices 2 are realized to that the user has numerous fastening options. These options include fastening to or on a head covering (FIGS. 3*a* and 3*b*), to a handle (FIG. 3*c*), to necklaces or body chains (FIG. 3*d*), by Velcro®-type fasteners (fasteners made up of opposing pieces of fabric, one with a dense arrangement of tiny nylon hooks and the other with a dense nylon pile, that interlock when pressed together) e.g. to the upper arm or to any other location on clothing, as well as to purses, handbags or other objects.

The at least one light source 3 can be an incandescent bulb, a light-emitting diode or a similar component. In particular, this application teaches the use of an LCD or plasma monitor in addition to the required control and actuation system, which can be provided in the form of a minicomputer, for example.

This application further teaches that the light source 3 is suitable for the emission of flashes of light.

In one realization of the fastening device 10 for the color filter elements, color filter elements can be fastened easily but securely in these fastening devices 10. The color filter elements are preferably thin elements with a large surface area which, when they are illuminated by the light sources 3, emit a high-intensity colored light. There are many realizations of such fastening devices in the prior art, as a result of which no further description is required here.

The energy source can be any suitable element from the prior art. For example, the use of batteries, storage batteries, solar cells or even manually operated dynamos is possible and appropriate.

The flashing light 5 is an electrically operated multiple-use flashlight, e.g. of the type known from photography or a stroboscope light.

The scope of operation of the electronic control unit 9 and the components that are contained in or associated with this unit are explained in the following description of the modes of operation.

A plurality of modes of operation are provided for the device and variations thereof described herein, as described below.

Manual Operation

In this mode of operation, the user employs the manual control element 8 which is connected with the device by means of the connection 7, and uses the device to create an effect or impression according to his own imagination and wishes or instructions.

For example, the user can activate the light sources 3 continuously or periodically, which can have strong emotional potential, especially if the user has inserted color filter elements in his favorite colors, e.g. the colors of a football team, into the fastening elements 10.

The user can also emit one or more flashes via the flashing light 5, which is particularly effective at creating an overwhelming impression when a large number of devices as described herein are used simultaneously.

In addition to the emission of the light signals described above, the user can also emit audio signals by means of the loudspeaker 4. Said audio signals can initially be signals that are stored in digital or analog form in or on media that are located inside the housing 1 and/or the electronic control unit 9.

Said means can be, for example, digital memory elements for speech, music or song.

According to at least one embodiment, it is also provided that a plurality of audio signals that are different from one another can be stored and retrieved independently of one another for playback in any desired sequence.

In addition to the emission of previously stored signals, it is also possible to emit via the loudspeaker 4 spoken or sung utterances of the user which have been recorded by the device on the basis of the microphone 6.

It goes without saying that for this purpose the device also contains an amplifier for audio signals to achieve a sufficient volume and/or acoustical pressure output.

In an additional particularly advantageous configuration or embodiment, to prevent feedback, this application teaches that the microphone 6 must not be fastened directly to the housing 1. The fastening in this configuration is insulated and is at some distance from the loudspeaker 4, e.g. on a gooseneck, which also makes possible an improved positioning of the microphone with respect to the user's mouth.

Synchronization

With this mode of operation, the user essentially performs no manual interventions, although such manual interventions are of course possible.

In at least one possible embodiment the device emits light and/or audio signals in synchronization with additional devices that are located nearby.

The synchronization necessary to achieve this effect can be achieved in several ways.

First, the invention teaches that the devices are automatically synchronized by the transmission and receipt of radio or wireless signals. Methods of this type are described in the prior art and therefore do not need to be explained in any further detail here.

In an additional configuration, the devices that are located within a certain area are all synchronized by the receipt of a signal that is broadcast from an external transmitter and then all emit flashes of light simultaneously, for example.

In an additional configuration, the device contains a radio clock module, which controls the device so that it emits the desired signals at specified times. These times can be, for example, intervals of 5 seconds, 10 seconds, 15 seconds etc.

Because all of the devices located at a given site receive or have the same time information, this mode of operation makes it possible to synchronize even a large number of devices easily.

Remote Control

An additional mode of operation is the remote control of the devices, whereby as used in this document, the term "remote control" is intended to mean both radio remote control as well as remote controls that operate according to any other desired principle, such as light, sound etc.

A distinction can be made between two sub-modes of this type of operation.

The first sub-mode is unaddressed remote control.

In this mode of operation, all the devices located in a specified area, e.g. in a concert hall or a football stadium, are actuated simultaneously. According to at least one possible embodiment, at least one of the functions of the device, but preferably all the functions, can be initiated individually and independently of one another by a central remote control system, regardless of whether the signals in question are light signals or audio signals.

The second sub-mode is addressed remote control.

For this mode of operation, each device contains means that make it possible to recognize and evaluate an address that is contained in the remote control signals.

Furthermore, each device, or a group of any desired number of devices, can be set to a previously selected address, and consequently this device or these devices will execute only the remote control commands that are intended specifically for them.

For this type of operation, the number of available addresses is of particular importance, because the more addresses that are available, the more impressive the lighting and/or audio effects that can be achieved.

With a sufficient number of addresses, the following effects can be achieved in a football stadium, for example: "chaser" lights, traveling lights, bursts of light, sound clouds, audio signals broadcast from changing banks of speakers etc.

For both modes of remote control, according to at least one possible embodiment audio signals that are emitted by the at least one loudspeaker such as, for example, speech, noises or song are transmitted by remote control or remote transmission to a device or a group of devices and are then emitted by said group of devices.

When devices—with specified addresses—are positioned before the game, and installed color filter elements mounted on the seats, special effects can be achieved, such as for example the illustration of national flags or club logos, as well as the multi-part playing of national anthems or team songs and fight songs.

This mode of operation can be designed more economically—with sufficiently wide separation of said devices—so that the devices themselves are not exposed on the seats, but only, for example, written instructions indicating how the holders of the seats in question are supposed to set their devices.

The application also teaches that the setting instructions are applied in a fixed and permanent manner to the seat and/or standing places.

In a further significant improvement, as the audience member enters the stadium or the concert hall, the location of said audience member's seat and/or standing place, which is generally indicated on the admission ticket, is read or scanned, whereupon the device address provided for the seat or standing place in question is directed to the device by radio signal.

For a development of at least one possible embodiment and/or the realization of the above functions, this application teaches that certain addresses can be selected by a selector switch that is located on the device, so that the audience members sitting or standing in certain areas of the stadium for a big event are given instructions by stadium personnel or by instructions that are located at the seat.

For example, the following method can be applied: left side, south stand, Address 1, center South stand Address 2, right edge South stand Address 3, left edge grandstand Address 4, etc.

To realize these modes of operation, the devices have means to receive the remote control signals.

In an additional, particularly advantageous realization or embodiment, the audio signals received through the microphone are used to trigger light and/or audio signals.

For that purpose, first, flashes of light and/or other light or audio signals are triggered when a defined noise level is exceeded. The audio signals received through the microphone are analyzed with reference to the frequencies they contain and certain frequencies are used to actuate light and/or audio signals. A comparable function is known on light organs, for example.

The individual sub-modes of operation can be selected by selector switches and/or by switches/buttons.

A concrete realization that does not include one or more of the operating modes or the sub-functions within the operating modes described above is still within the scope of the invention, as are realizations in which additional modes of operation and/or subfunctions are added.

Figure 4:
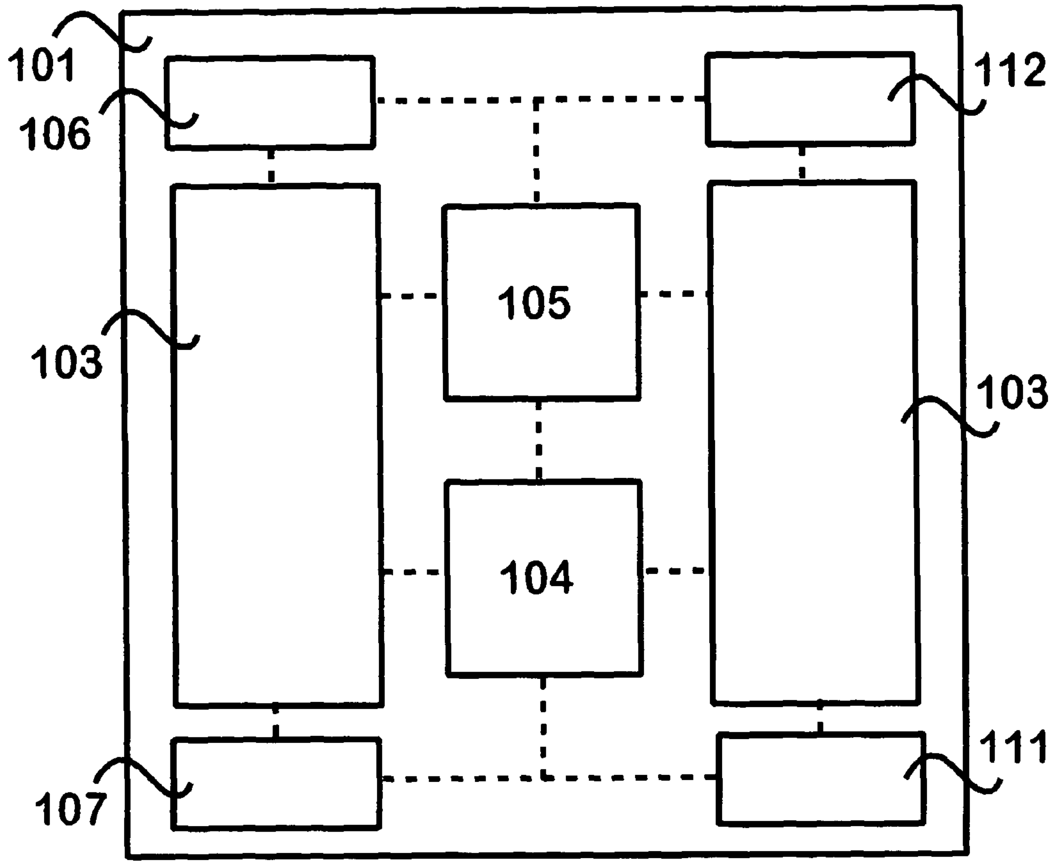
FIG. 4 shows a block diagram of an individual entertainment display device according to at least one possible embodiment.

FIG. 4 shows a block diagram of an individual entertainment display device according to at least one possible embodiment. The entertainment display device has a housing 101 to house the components thereof. The entertainment display device has two light sources or emitters 103 which are designed to produce light of various intensity and/or color at various time intervals for various durations of time. In at least one other possible embodiment there can be more or less than two light sources 103. In another possible embodiment, the light emitters 103 could be LCD or plasma screens that produce light or images. There is also another light source or emitter 105, which is in the form of a strobe light or other similar flashing light. A sound speaker 104 emits sound, which sound can comprise music, vocal sounds or speech, sound effects, or any other desired sound. A sound recording or receiving device 106, which can be in the form of a microphone or other similar receiver, receives incoming sounds. Such sounds can be recorded or stored for future playback through the speaker 104, or can be transmitted directly to the speaker 104 for immediate play. There is also a connecting device or interface 107 which is designed to permit connection of a manual input device (not shown), which will described further below.

The above components are powered by a power or energy source 111, which can be essentially any type of suitable power source, such as batteries, rechargeable batteries, power cells, etc. The power source 111 can have an activation or on/off switch to permit switching on and off of the entertainment display device. The above components are controlled by a computer control or central processing unit 112, herein after referred to for purpose of simplicity as the computer 112. The computer 112 controls and coordinates the various functions of the components according to commands from a user, from a central control unit, or from another entertainment display device. For example, the computer 112 can control the duration of an emission of light by the light sources 103. The computer 112 could store sounds received via the audio receiving device 106, or could process voice commands input via the audio receiving device 106 or perform voice recognition of the user. The computer 112 could also be programmed to analyze and determine the audio level of the sound received via the receiving device 106, and compensate for the audio level by either increasing or decreasing the audio level output by the speaker 104 as desired. The computer 112, according to at least one possible embodiment, could store more than one sound, which sounds could be each played back individually and in any order. The computer 112 further could coordinate various combinations or sequences of lights and/or sounds according to a desired program. The computer 112 could also have an internal clock or radio clock. Essentially any and all operations of the entertainment display device can be controlled, monitored, and coordinated by the computer 112, according to at least one possible embodiment.

Figure 5:
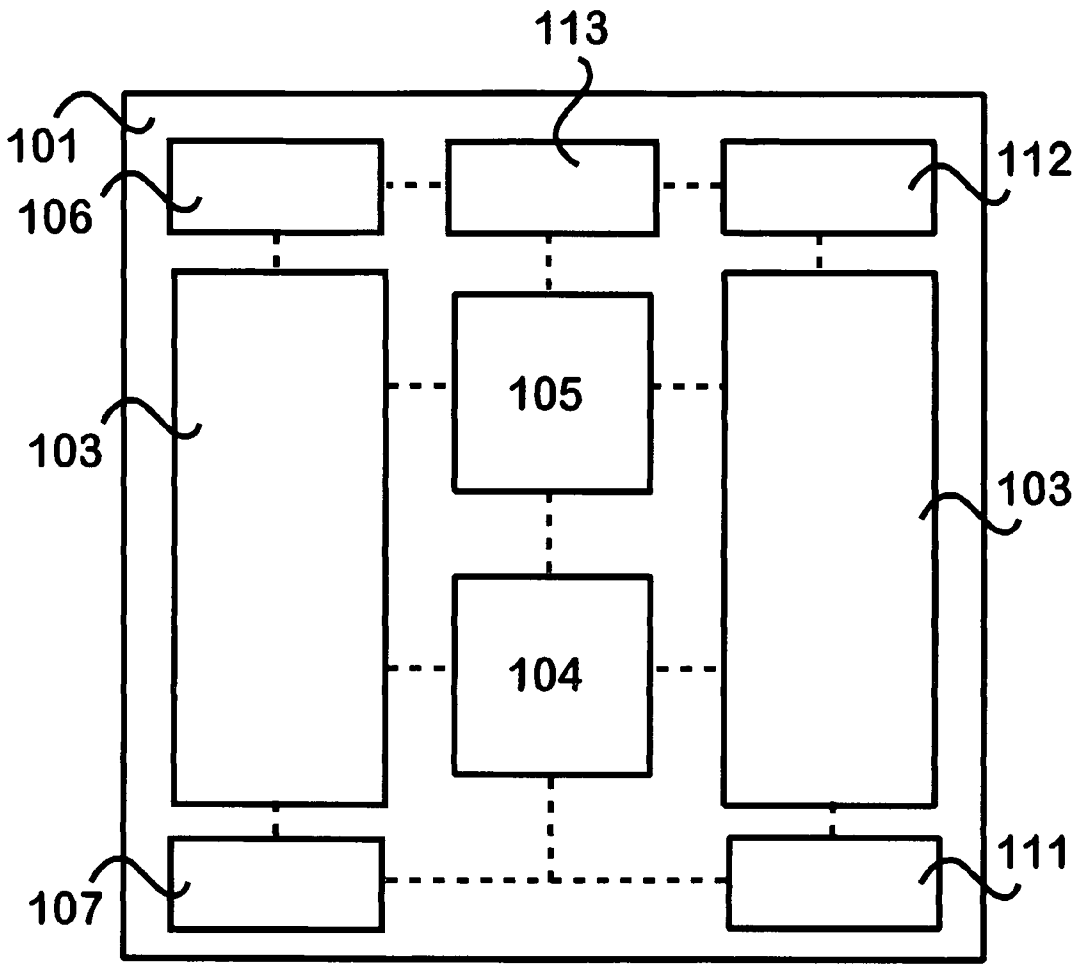
FIG. 5 shows a block diagram of an individual entertainment display device according to at least one possible embodiment.

FIG. 5 shows a block diagram of an individual entertainment display device according to at least one possible embodiment. In the embodiment shown in FIG. 5, the entertainment display device also includes a wireless receiving device 113, which is designed to permit the entertainment display device to receive wireless signals from other entertainment display devices or control units or other data devices. The wireless receiver 113 can permit remote control of the entertainment display device. The wireless receiver 113 can be designed to receive all types of transmitted signals, such as audio, radio, or light signals. The audio signals could be stored in the computer 112 for playback via the speaker 104. The wireless receiver 113 could also receive data, such as operational commands or programming for light and/or sound sequences.

Figure 6:
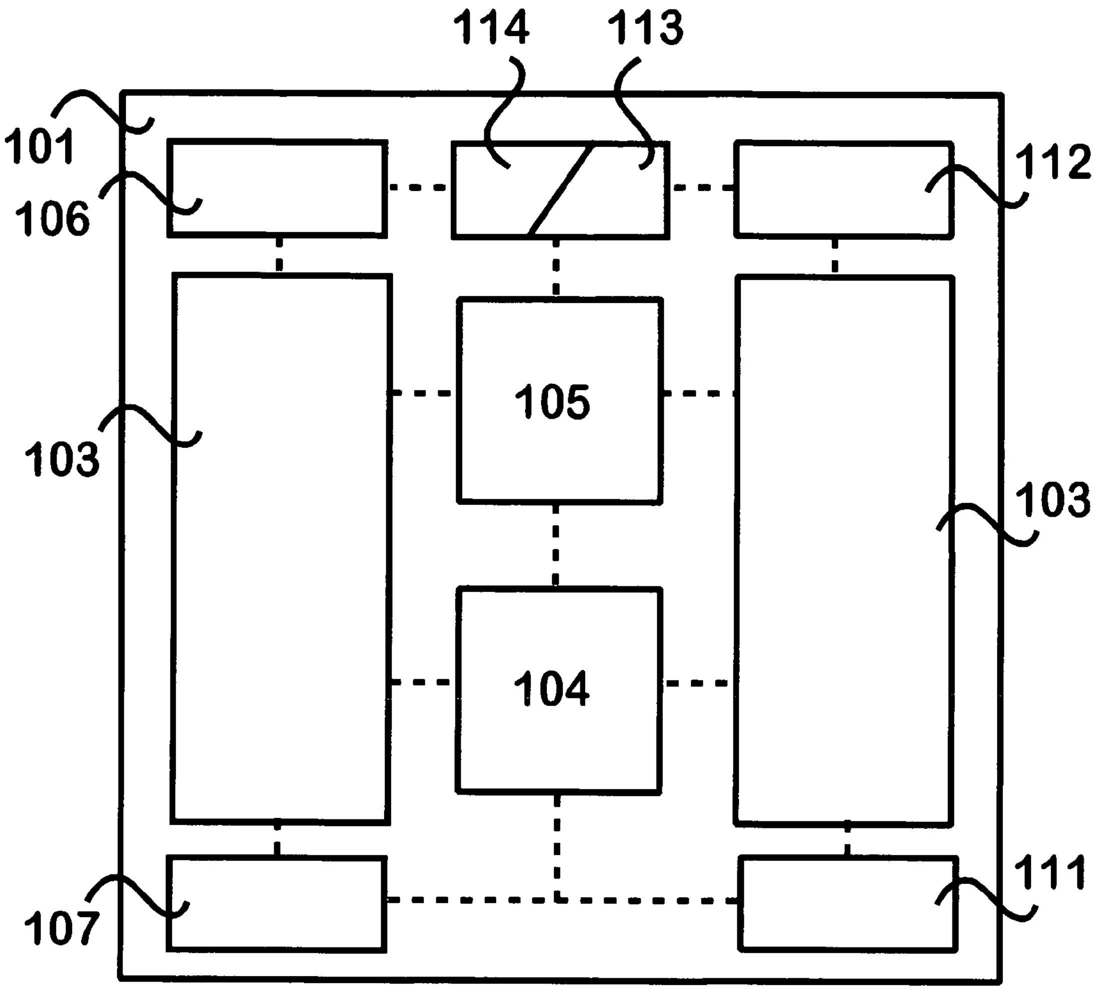
FIG. 6 shows a block diagram of an individual entertainment display device according to at least one possible embodiment.

FIG. 6 shows a block diagram of an individual entertainment display device according to at least one possible embodiment. In the embodiment shown in FIG. 6, the wireless receiver 113 works in conjunction with a wireless transmitter 114, so the entertainment display device can both receive and transmit signals. For example, the wireless transmitter 114 could transmit location information, such as seat number and section number in a stadium or concert hall.

Figure 7:
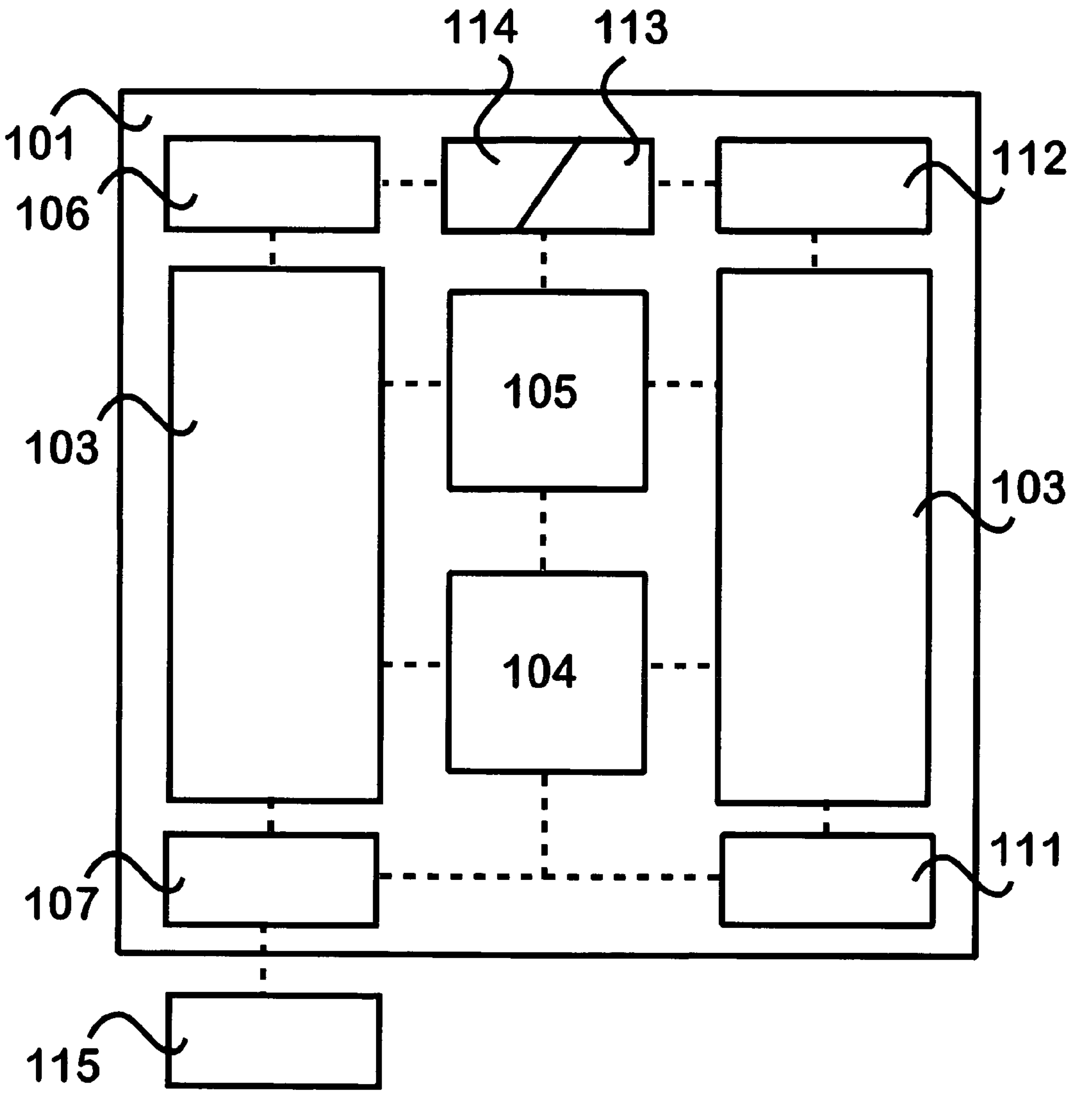
FIG. 7 shows a block diagram of an individual entertainment display device according to at least one possible embodiment.

FIG. 7 shows a block diagram of an individual entertainment display device according to at least one possible embodiment. The entertainment display device has an input device 115 connected thereto via the connector 107. The input device 115 could be in the form of a keyboard or keypad with alphanumeric characters, symbols, pictures, or a combination thereof. The input device 115 could also be a touchscreen with a menu. The input device 115 could be apart from the housing 101 and connected by a cable or wire into the connector 107, or it could be joined, either removably or permanently, to the housing 101 as an integral part of the entertainment display device. The input device 115 could also have a volume or other audio controls for the sound output by the speaker 104.

The input device 115 would allow for manual control of one or more functions of the entertainment display device by a user. For example, the input device 115, in at least one possible embodiment, could present a variety of operational choices for the user, such as which lights to turn on and at what intervals, duration, and intensity, or what sounds or music to play and in what sequence. Aside from operational commands, the input device 115 could also allow the user to input data of various kinds, such as the location of the entertainment display device in a stadium, or possibly personal identification information of the user in the event of loss or theft of the entertainment display device. It should be understood that the entertainment display device could be designed to permit all manner of data and commands to be input via the input device 115.

In another possible embodiment, the input device 115 could be a computer, personal data assistant, or digital music device, for example. In such an embodiment, the input device 115 could be connected to permit the uploading, for example, of operational programming for the light and/or sound sequences or digital music for storage and playback.

The input device 115, according to at least one possible embodiment, permits the entertainment display device to be a self-contained unit that would not require connection to an outside control system or unit. Users could individually program the entertainment display device to perform whatever function the user desires.

Figure 8:
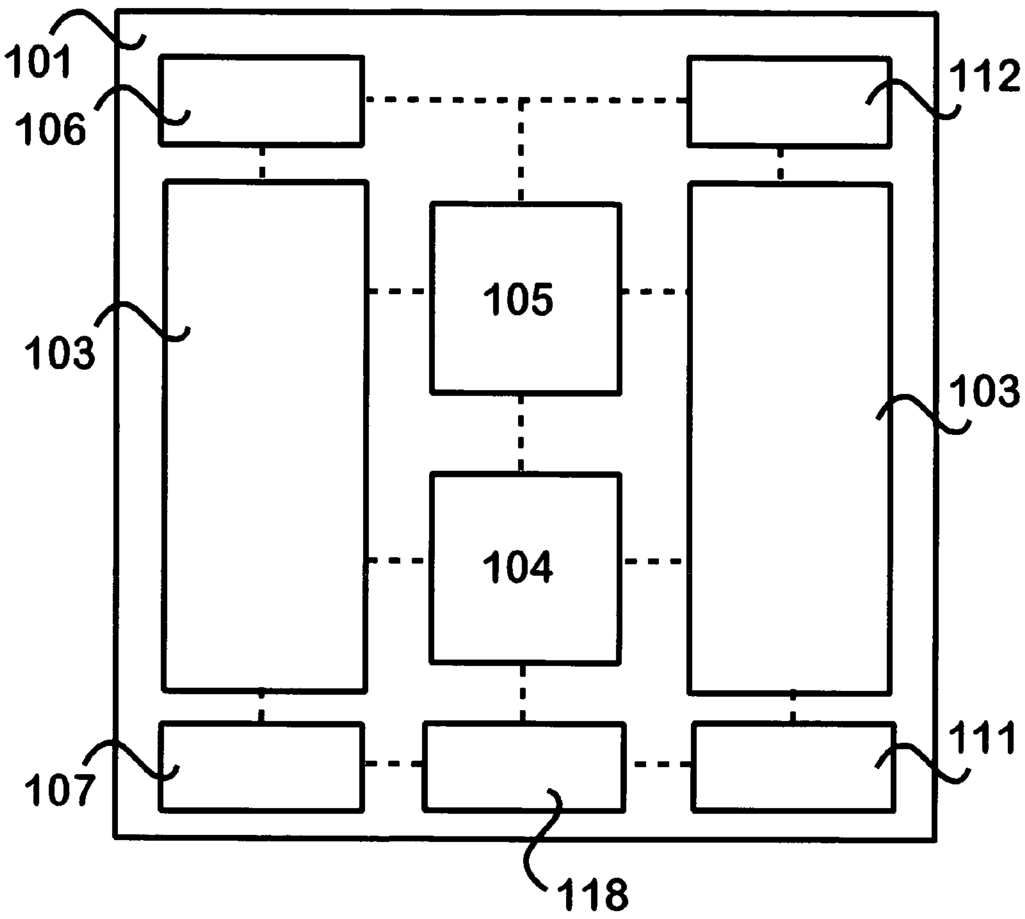
FIG. 8 shows a block diagram of an individual entertainment display device according to at least one possible embodiment.

FIG. 8 shows a block diagram of an individual entertainment display device according to at least one possible embodiment. The entertainment display device has a global positioning system (GPS) device 118. The GPS device 118 could be used to relay the location of the entertainment display device to a central monitoring system.

Figure 9:
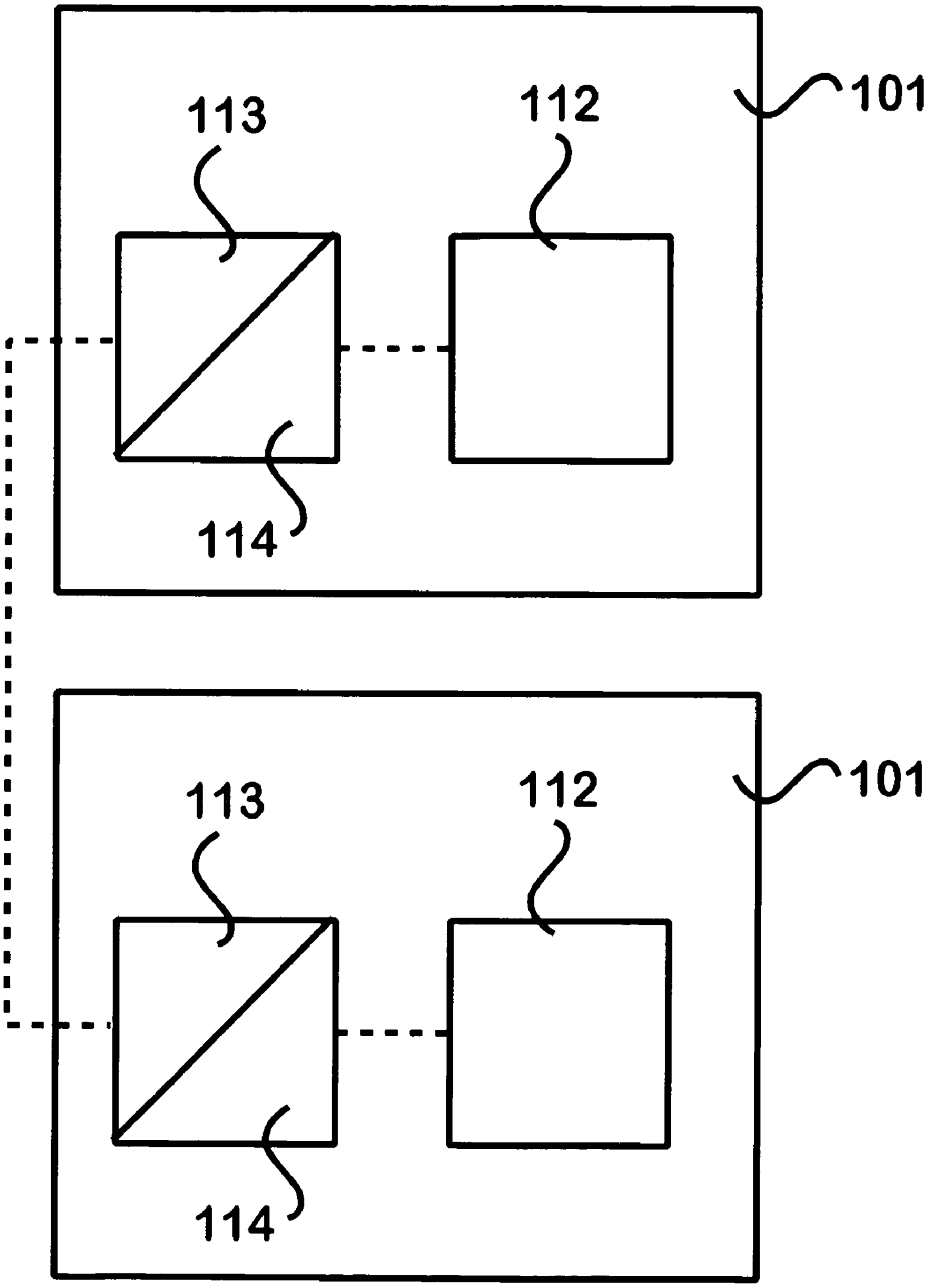
FIG. 9 shows a block diagram of an individual entertainment display device in communication with another individual entertainment display device according to at least one possible embodiment.

FIG. 9 shows a block diagram of an individual entertainment display device in communication with another individual entertainment display device according to at least one possible embodiment. In this simplified view, two entertainment display devices are shown in communication with one another via the wireless transmitter 14 and receiver 13 arrangement, which is connected to and controlled by the computer 112. This particular set up permits a variety of functions to be performed between two or more entertainment display devices. For example, the entertainment display devices could exchange programming or operational data in order to coordinate or synchronize the operation thereof. The entertainment display devices could then perform identical functions or coordinated functions, such as alternating lights or portions of a musical piece, for example. The entertainment display devices could also exchange data stored in their respective computers 112.

In another possible embodiment, the entertainment display devices could be utilized for communication between users, similar to cell phones or walkie-talkies. In such an embodiment, one user could speak into his entertainment display device via the sound receiving device 106, which could be a microphone. The recorded sound could then be transmitted from the one entertainment display device to the other entertainment display device, which would then output the sound through the speaker 104 to permit communication. In yet another possible embodiment, the sound receiving device 106 could be a dual receiver/speaker that could both receive and output sound.

Figure 10:
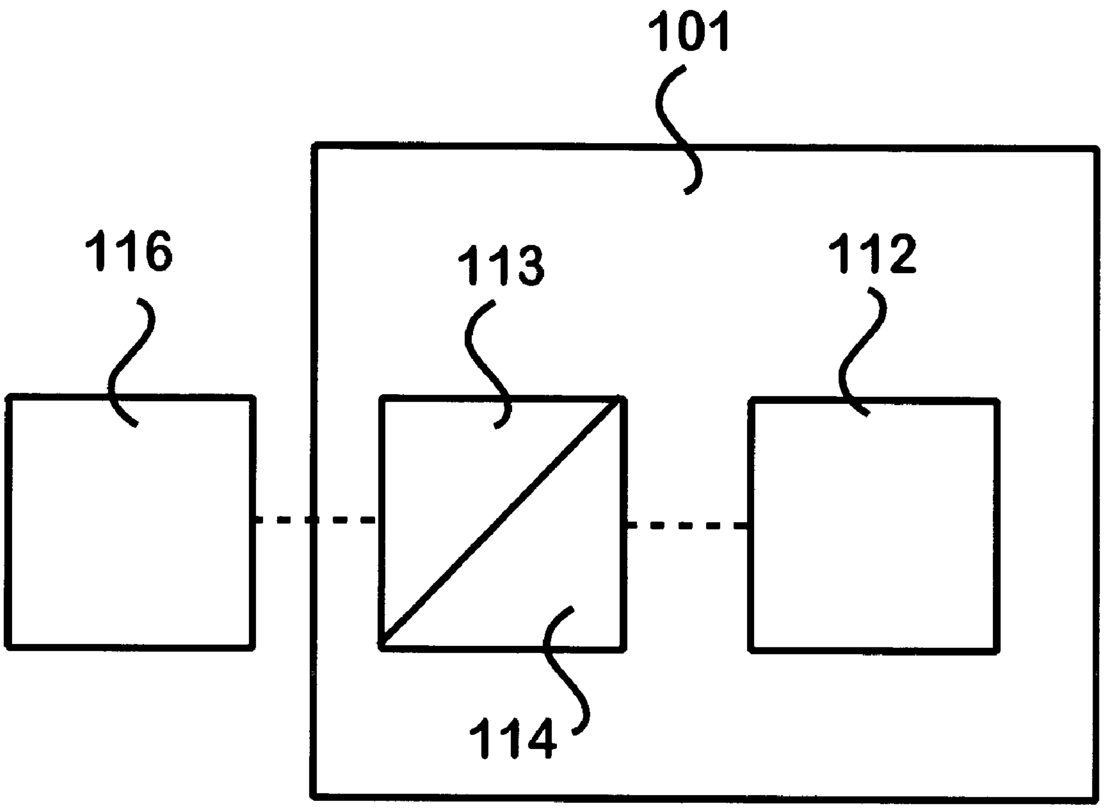
FIG. 10 shows a block diagram of an individual entertainment display device in communication with a wireless device, such as a cellular telephone, according to at least one possible embodiment.

FIG. 10 shows a block diagram of an individual entertainment display device in communication with a wireless device 116, such as a cellular telephone, according to at least one possible embodiment. As is well known, cellular telephones can be utilized to communicate with various electronic systems and machines in various industries. Cellular telephones permit users to call or access automated systems and input either voice or alphanumeric commands to access data or perform tasks. In a similar manner, a user could utilize a cellular telephone to call his entertainment display device to input commands. For example, the user could input stadium seat location data into the entertainment display device via the cellular telephone. Other wireless devices 116 that perform similar functions could also be used.

Figure 11:
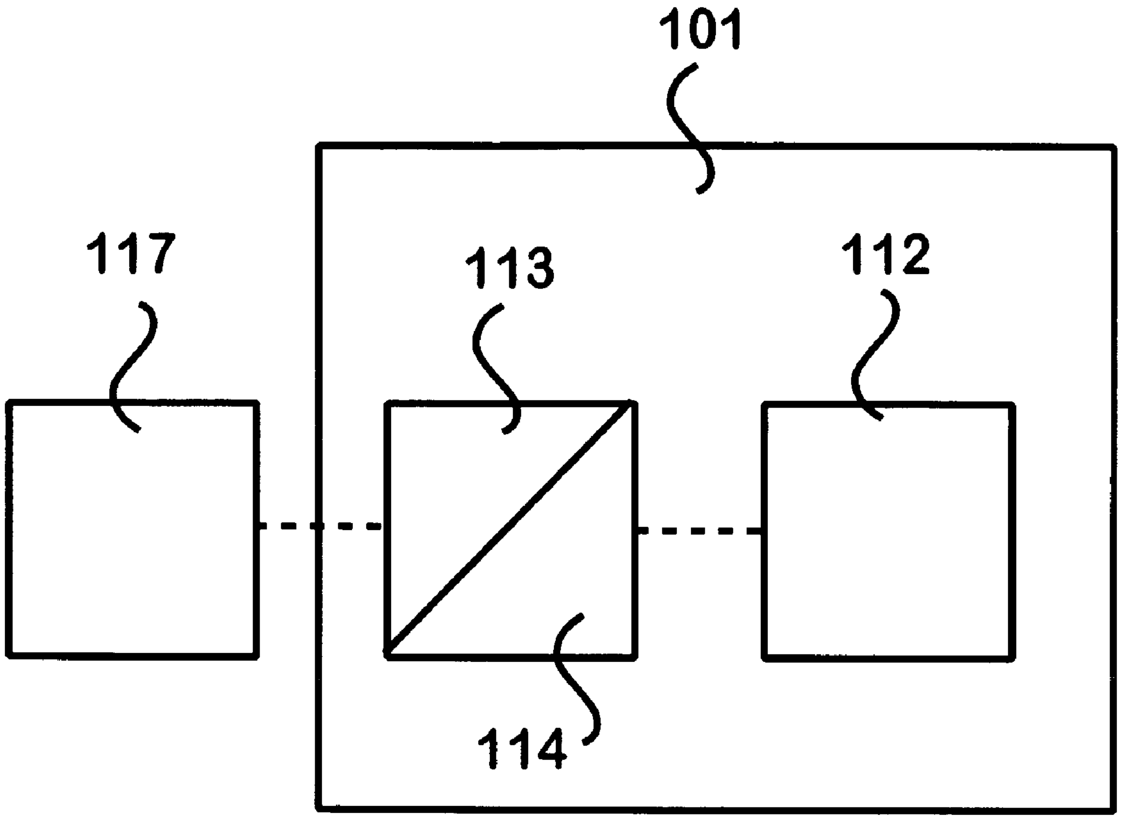
FIG. 11 shows a block diagram of an individual entertainment display device in communication with a central control unit or hub according to at least one possible embodiment.

FIG. 11 shows a block diagram of an individual entertainment display device in communication with a central control unit or hub 117 according to at least one possible embodiment. In this embodiment, the individual entertainment display devices communicate with the central control unit 117 to exchange data relating to the operation of the entertainment display device. For example, a control unit 117 could be located at a stadium for events. The control unit 117 could be programmed with many different kinds of data, such as the location of all seats in the stadium or catalogs of music and video. The control unit 117 would be in communication with one or more of the entertainment display devices in the stadium and would control all or most of the operations of the entertainment display devices. For example, the control unit 117 could have stored in its memory a particular song or anthem for the home team at a sporting event. The control unit 117 could control and coordinate the operation of entertainment display devices to play the song at particular times during a game. The control unit 117 could execute a lighting program where the entertainment display devices would be coordinated together to display, for example, a team's uniform colors or a series of light emissions of various intensity and duration.

The control unit 117 could also act as a hub for communication between entertainment display devices. As discussed previously, the entertainment display devices, in at least one embodiment, communicate directly with one another via wireless transmitter/receiver arrangements. However, in another possible embodiment, the entertainment display devices would communicate first with the hub 117, which would then route the communication to the desired entertainment display device or devices. The entertainment display devices, in another possible embodiment, would be incapable of communicating with one another without the hub 117.

Figure 12:
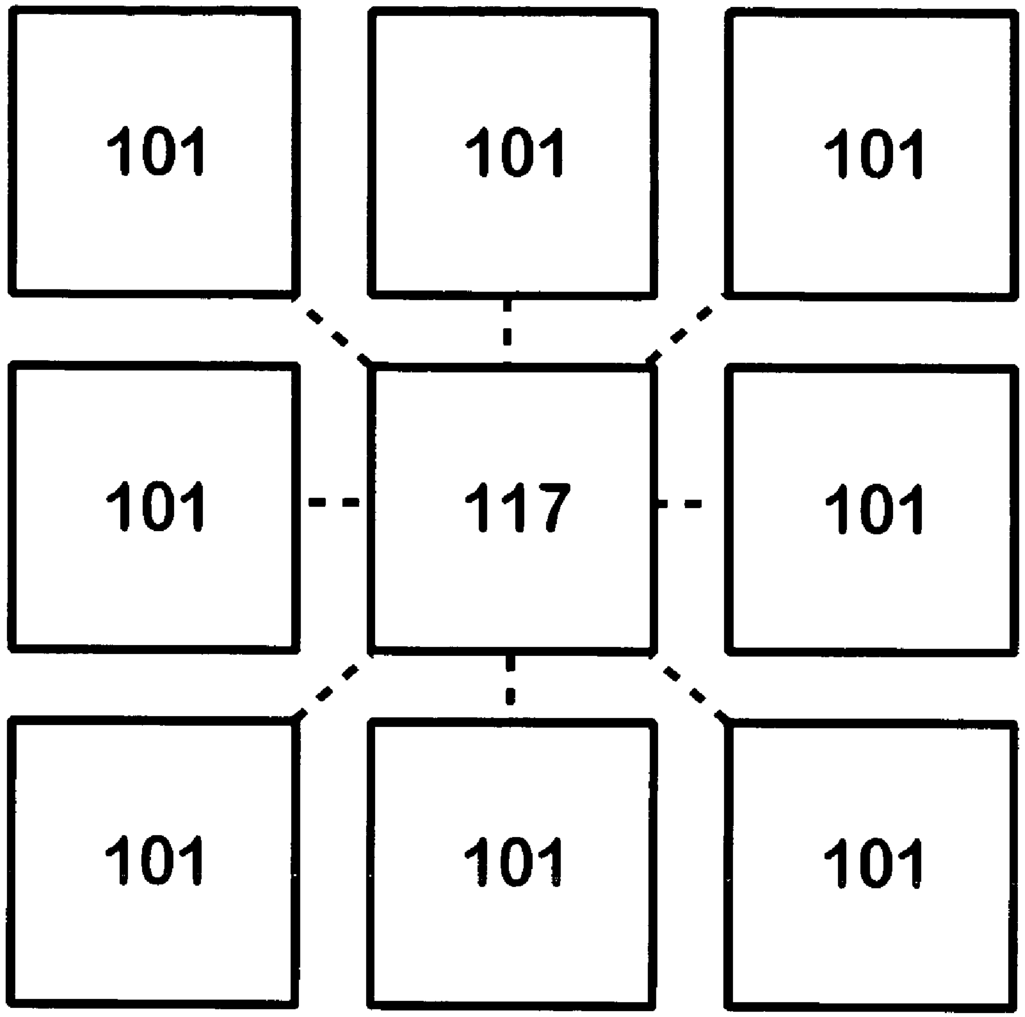
FIG. 12 shows a block diagram of a plurality of individual entertainment display devices in communication with a central control unit or hub according to at least one possible embodiment.

FIG. 12 shows a block diagram of a plurality of individual entertainment display devices (only the housings 101 of a the entertainment display devices are marked for purposes of example) in communication with a central control unit or hub 117 according to at least one possible embodiment. It should be understood that any number of individual entertainment display devices, not just the number shown in FIG. 12, could be in communication with the control unit 117.

Figure 13:
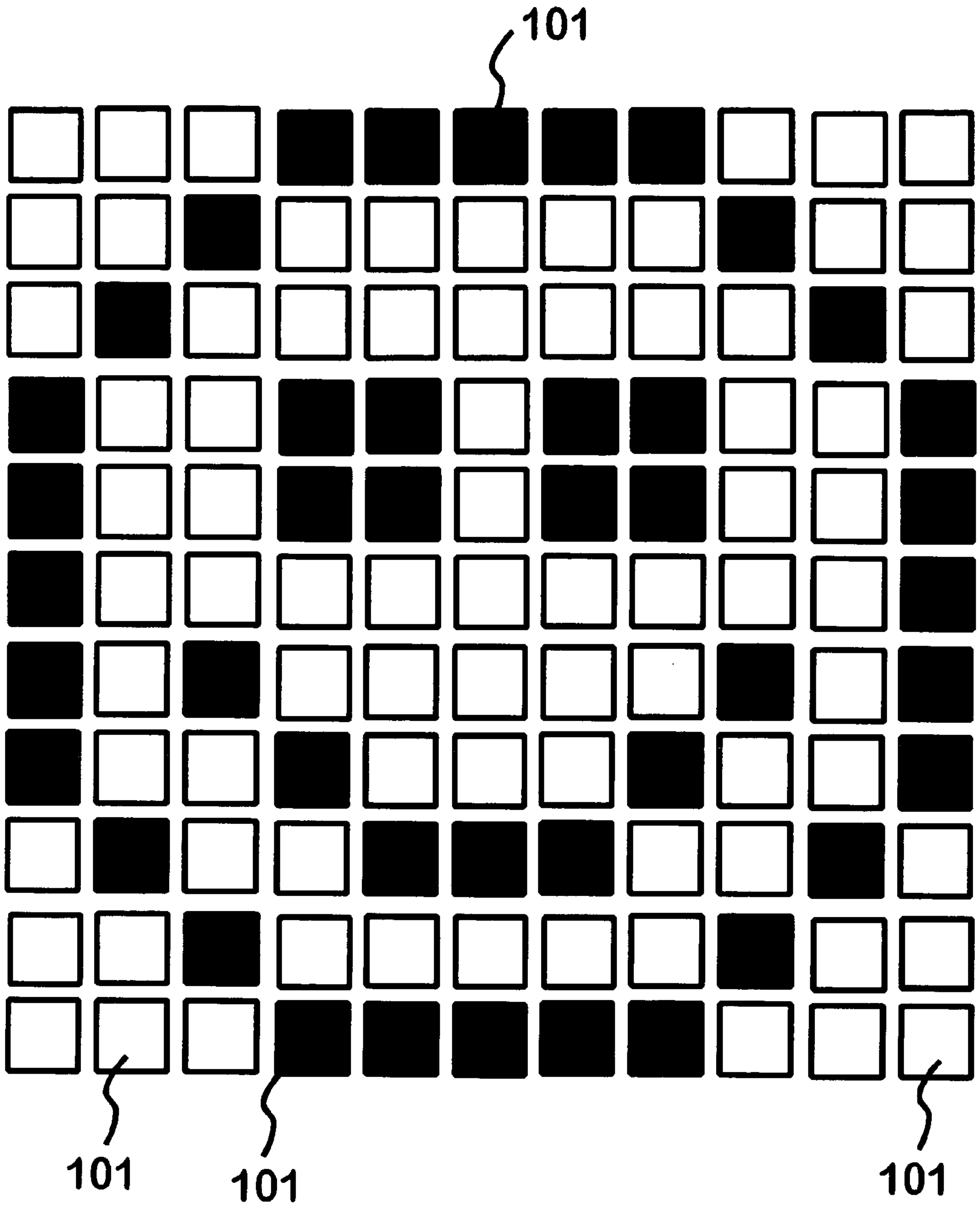
FIG. 13 shows a block diagram of a plurality of individual entertainment display devices in use at a stadium event to produce an image according to at least one possible embodiment.

FIG. 13 shows a block diagram of a plurality of individual entertainment display devices (only the housings 101 of a few entertainment display devices are marked for purposes of example) in use at a stadium event to produce an image according to at least one possible embodiment. In this embodiment, for example, each entertainment display device could provide the control unit 117 with seat location information to enable the control unit 117 to instruct each particular entertainment display device to perform an individual function. In the particular example shown in FIG. 13, some of the entertainment display devices have been instructed by the control unit 117 to emit a darker-shaded or darker-colored light, while other entertainment display devices are emitting a lighter-shaded or lighter-colored light to produce a smiley face. Of course, much more complicated images or alphanumeric messages could be produced using such a system. Moving images or messages could also be possible which move across the stadium or are in motion in one area. In another possible embodiment, each individual entertainment display device could have one or more control programs stored in the computer 112, which programs would be specific to a particular stadium or event. The user could then input seat location information into the entertainment display device, which seat location information would be utilized in the control program to determine the particular function of the entertainment display device for that particular seat. In this manner, a control unit or hub 117 would be unnecessary.

It should be understood that the invention and possible embodiments thereof are not limited to the embodiments described herein. It should further be understood that any component of one embodiment could be used in any other possible embodiment. Also, any of the components of any of the embodiments could be added to or removed from any of the embodiments to form other possible embodiments not explicitly set forth herein.

The invention relates to a light module for big events, said light module comprising a housing (1), an energy source, and at least one light source (3). The inventive module also contains means that enable the module to be manually operated and/or remote-controlled and/or operated with other modules in a self-synchronizing manner.

One feature or aspect of an embodiment is believed at the time of the filing of this patent application to possibly reside broadly in a light module or device for big events with a housing, an energy source and at least one light source, characterized in that the module contains means that make it possible to operate the module manually and/or by remote control and/or in self-synchronization with additional modules.

Another feature or aspect of an embodiment is believed at the time of the filing of this patent application to possibly reside broadly in the device, wherein said device contains at least one loudspeaker.

Yet another feature or aspect of an embodiment is believed at the time of the filing of this patent application to possibly reside broadly in the device, wherein said device contains means for the storage of at least one audio signal.

Still another feature or aspect of an embodiment is believed at the time of the filing of this patent application to possibly reside broadly in the device, wherein a plurality of stored audio signals can be retrieved for playback independently of one another and in any desired sequence.

A further feature or aspect of an embodiment is believed at the time of the filing of this patent application to possibly reside broadly in the device, wherein the device contains an amplifier for audio signals.

Another feature or aspect of an embodiment is believed at the time of the filing of this patent application to possibly reside broadly in the device, wherein the device contains a receiver module for remote-control signals.

Yet another feature or aspect of an embodiment is believed at the time of the filing of this patent application to possibly reside broadly in the device, wherein the device contains means that make possible the receipt and playback of remotely transmitted audio signals.

Still another feature or aspect of an embodiment is believed at the time of the filing of this patent application to possibly reside broadly in the device, wherein the device contains a module that makes possible the recognition and evaluation of addressing signals contained in the remote-control signal.

A further feature or aspect of an embodiment is believed at the time of the filing of this patent application to possibly reside broadly in the device, wherein the device contains means that associate the device with an address that can be addressed by remote control.

Another feature or aspect of an embodiment is believed at the time of the filing of this patent application to possibly reside broadly in the device, wherein the device contains means that make it possible to trigger the emission of light and/or audio signals independently of each other and in any desired sequence.

Yet another feature or aspect of an embodiment is believed at the time of the filing of this patent application to possibly reside broadly in the device, wherein the device contains means for self-synchronization with additional devices.

Still another feature or aspect of an embodiment is believed at the time of the filing of this patent application to possibly reside broadly in the device, wherein said means are transmitter and receiver modules for radio or light or audio signals.

A further feature or aspect of an embodiment is believed at the time of the filing of this patent application to possibly reside broadly in the device, wherein said means are a radio clock module.

Another feature or aspect of an embodiment is believed at the time of the filing of this patent application to possibly reside broadly in the device, wherein the device contains at least one fastening device for color filter elements.

Yet another feature or aspect of an embodiment is believed at the time of the filing of this patent application to possibly reside broadly in the device, wherein the device contains at least one flashing light.

Still another feature or aspect of an embodiment is believed at the time of the filing of this patent application to possibly reside broadly in the device, wherein the device contains a manual operating element.

A further feature or aspect of an embodiment is believed at the time of the filing of this patent application to possibly reside broadly in the device, wherein the device contains at least one microphone.

Another feature or aspect of an embodiment is believed at the time of the filing of this patent application to possibly reside broadly in the device, wherein the microphone is fastened indirectly to the housing.

Yet another feature or aspect of an embodiment is believed at the time of the filing of this patent application to possibly reside broadly in the device, wherein the device contains means for the analysis of the frequencies received through the microphone.

Still another feature or aspect of an embodiment is believed at the time of the filing of this patent application to possibly reside broadly in the device, wherein the device contains means for the determination of the audio level received through the microphone.

A further feature or aspect of an embodiment is believed at the time of the filing of this patent application to possibly reside broadly in the device, wherein the device can be fastened to a cap or hat.

Another feature or aspect of an embodiment is believed at the time of the filing of this patent application to possibly reside broadly in the device, wherein the device can be fastened to a handle.

Yet another feature or aspect of an embodiment is believed at the time of the filing of this patent application to possibly reside broadly in the device, wherein the device can be fastened to a necklace or a chain suspended on another part of the body.

Still another feature or aspect of an embodiment is believed at the time of the filing of this patent application to possibly reside broadly in the device, wherein the device includes a Velcro®-type fastener (a fastener made up of opposing pieces of fabric, one with a dense arrangement of tiny nylon hooks and the other with a dense nylon pile, that interlock when pressed together).

A further feature or aspect of an embodiment is believed at the time of the filing of this patent application to possibly reside broadly in the device, wherein the light source is an LCD or plasma monitor.

Another feature or aspect of an embodiment is believed at the time of the filing of this patent application to possibly reside broadly in a method for the operation of the device, wherein the device can be operated manually and/or remotely controlled and/or in self-synchronization with additional devices.

Yet another feature or aspect of an embodiment is believed at the time of the filing of this patent application to possibly reside broadly in a method for the operation of the device, wherein the remote control address to be set in the device is attached in a fixed and permanent manner to the seats and/or standing places.

Still another feature or aspect of an embodiment is believed at the time of the filing of this patent application to possibly reside broadly in a method for the operation of the device, wherein the remote control address to be set on the device is determined on the basis of the seating or standing place information contained in the admission ticket and is then transmitted wirelessly into the device.

The components disclosed in the various publications, disclosed or incorporated by reference herein, may possibly be used in possible embodiments of the present invention, as well as equivalents thereof.

Some examples of LED arrays or displays and components therefor that may possibly be utilized or adapted for use in at least one possible embodiment may possibly be found in the following U.S. patents: U.S. Pat. No. 7,008,079, entitled "Composite reflecting surface for linear LED array;" U.S. Pat. No. 7,008,078, entitled "Light source having blue, blue-green, orange and red LED's;" U.S. Pat. No. 7,005,683, entitled "Resin-packaged led light source;" U.S. Pat. No. 7,004,602, entitled "LED light apparatus and methodology;" U.S. Pat. No. 7,001,047, entitled "LED light source module for flashlights;" U.S. Pat. No. 6,998,594, entitled "Method for maintaining light characteristics from a multi-chip LED package;" U.S. Pat. No. 6,997,772, entitled "Interactive device LED display;" U.S. Pat. No. 6,995,681, entitled "LED warning signal light and movable support;" U.S. Pat. No. 6,994,461, entitled "LED lamp for vehicle signal light;" and U.S. Pat. No. 6,991,356, entitled "LED curing light."

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

Some examples of LCD displays and components therefor that may possibly be utilized or adapted for use in at least one possible embodiment may possibly be found in the following U.S. patents: U.S. Pat. No. 6,996,446, entitled “System and method of monitoring, predicting and optimizing production yields in a liquid crystal display (LCD) manufacturing process;” U.S. Pat. No. 6,995,813, entitled “Rotating and reversing mechanism for LCD display;” U.S. Pat. No. 6,992,364, entitled “Array substrate for use in LCD device and method of fabricating same;” U.S. Pat. No. 6,980,195, entitled “Window brightness enhancement for LCD display;” U.S. Pat. No. 6,972,814, entitled “Reflection type color liquid crystal display (LCD);” U.S. Pat. No. 6,970,121, entitled “Digital to analog converter, liquid crystal display driving circuit, method for digital to analog conversion, and LCD using the digital to analog converter;” U.S. Pat. No. 6,965,127, entitled “Transflective LCD (Liquid Crystal Display) panel and method of constructing the same;” U.S. Pat. No. 6,961,053, entitled “LCD display device with display density adjusting function;” U.S. Pat. No. 6,960,927, entitled “System and method of monitoring, predicting and optimizing production yields in a liquid crystal display (LCD) manufacturing process;” and U.S. Pat. No. 6,960,001, entitled “Backlight apparatus, and a liquid crystal display (LCD) therewith.”

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

Some examples of plasma screens or displays and components therefor that may possibly be utilized or adapted for use in at least one possible embodiment may possibly be found in the following U.S. patents: U.S. Pat. No. 7,009,341, entitled “Color plasma display panel;” U.S. Pat. No. 7,009,330, entitled “Composition of plasma display panel;” U.S. Pat. No. 6,999,047, entitled “Displaying video on a plasma display panel;” U.S. Pat. No. 6,998,781, entitled “Plasma display device having barrier ribs;” U.S. Pat. No. 6,998,780, entitled “Plasma display panel;” U.S. Pat. No. 6,998,779, entitled “Plasma display device;” U.S. Pat. No. 6,995,754, entitled “Plasma display module;” U.S. Pat. No. 6,995,521, entitled “Drive circuit for plasma display panel;” U.S. Pat. No. 6,995,512, entitled “Plasma display panel;” and U.S. Pat. No. 6,992,646, entitled “Plasma display panel.”

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

Some examples of global positioning systems (GPS) and components therefor that may possibly be utilized or adapted for use in at least one possible embodiment may possibly be found in the following U.S. patents: U.S. Pat. No. 7,009,948, entitled “Systems and methods for providing GPS time and assistance in a communications network;” U.S. Pat. No. 7,009,557, entitled “Interference rejection GPS antenna system;” U.S. Pat. No. 7,009,555, entitled “GPS-based positioning system for mobile GPS terminals;” U.S. Pat. No. 7,003,112, entitled “Extensible GPS receiver system;” U.S. Pat. No. 7,002,579, entitled “Split screen GPS and electronic tachograph;” U.S. Pat. No. 7,002,515, entitled “GPS receiver using software correlation for acquisition and hardware correlation for tracking;” and U.S. Pat. No. 6,998,929, entitled “Low threshold power frequency selective limiter for GPS.”

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state “Some examples of . . . which may possibly be used in at least one possible embodiment of the present application . . . ” may possibly not be used or useable in any one or more embodiments of the application.

The sentence immediately above relates to patents, published patent applications and other documents either incorporated by reference or not incorporated by reference.

Some examples of local broadcast systems and devices and components therefor that may possibly be utilized or adapted for use in at least one possible embodiment may possibly be found in the following U.S. patents: U.S. Pat. No. 6,950,655, entitled “Method and system wherein handover information is broadcast in wireless local area networks;” U.S. Pat. No. 6,950,644, entitled “Satellite broadcast receiving device having two local oscillation circuits and reduced spurious signal;” U.S. Pat. No. 6,806,830, entitled “Electronic device precision location via local broadcast signals;” U.S. Pat. No. 6,781,953, entitled “Broadcast protocol for local area networks;” U.S. Pat. No. 6,738,384, entitled “Technique for optimizing cut-through for broadcast and multi-cast packets in a multi-port bridge for a local area network;” U.S. Pat. No. 6,711,418, entitled “Wireless personal mobile data terminal receiving a wide-area broadcast and capable of two-way communication in a local area;" U.S. Pat. No. 6,546,488, entitled "Broadcast delivery of information to a personal computer for local storage and access;" U.S. Pat. No. 6,285,674, entitled "Hybrid distributed broadcast and unknown server for emulated local area networks;" U.S. Pat. No. 6,104,353, entitled "Local television antenna system for use with direct broadcast satellite television systems;" U.S. Pat. No. 5,636,345, entitled "Method and apparatus for detecting and preventing broadcast storms on an emulated local area network;" U.S. Pat. No. 5,583,866, entitled "Method for delivering broadcast packets in a frequency hopping local area network;" U.S Pat. No. 5,483,663, entitled "System for providing local originating signals with direct broadcast satellite television signals;" U.S. Pat. No. 5,452,303, entitled "Communication apparatus comprising a local processor for processing a broadcast frame;" U.S. Pat. No. 5,048,009, entitled "Broadcast station locator for a local area network;" and U.S. Pat. No. 4,097,809, entitled "Local event broadcast system."

All of the patents, patent applications or patent publications, which were cited in the International Search Report mailed Nov. 26, 2004, and/or cited elsewhere are hereby incorporated by reference as if set forth in their entirety herein as follows: U.S. Pat. No. 5,461,188, published Oct. 24, 1995; U.S. Pat. No. 6,270,229, published Aug. 7, 2001; U.S. Pat. No. 5,921,674, published Jul. 13, 1999; and U.S. Pat. No. 5,510,961, published Apr. 23, 1996.

The corresponding foreign and international patent publication applications, namely, Federal Republic of Germany Patent Application No. 103 42 595.0, filed on Sep. 15, 2003, having inventors Simon HANSEL and Thomas STIENEN, and DE-OS 103 42 595.0 and DE-PS 103 42 595.0, and International Application No. PCT/EP2004/009664, filed on Aug. 30, 2004, having WIPO Publication No. WO2005/028954 and inventors Simon HANSEL and Thomas STIENEN, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

> A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. An individual entertainment display kit to be used by a spectator at a spectator event to produce an entertainment presentation, said individual entertainment display kit comprising:

a support strap;

a plurality of color filter elements;

an entertainment display device comprising:

- a box-shaped housing being configured to be connected to said support strap to permit suspension of said box-shaped housing from a neck of a spectator;
- two light sources each being configured to emit light in an entertainment presentation;
- two holding arrangements, each being disposed immediately adjacent a corresponding one of said light sources;
- each of said holding arrangements being configured to receive and hold one of said color filter elements to permit a spectator to alter the color of the light emitted by both of said light sources by insertion of one of said color filter elements into a corresponding holding arrangement;
- a strobe light being configured to emit flashes of light in an entertainment presentation;
- an audio loudspeaker being configured to emit sound in an entertainment presentation;
- a computer control unit being operatively connected to said light sources, said strobe light, and said audio loudspeaker and being configured to control the operation of said light sources, said strobe light, and said audio loudspeaker in an entertainment presentation;

a manually-operated user interface being configured to permit a spectator to input operating instructions to said computer control unit to control the operation of said light sources, said strobe light, and said audio loudspeaker in an entertainment presentation; and a power source being configured and disposed to supply power to said light source, said strobe light, said audio loudspeaker, said user interface, and said control unit.

2. The individual entertainment display kit according to claim 1, wherein:

said box-shaped housing has a height, width, and depth, wherein said height is substantially greater than said depth, and said width is substantially greater than said height; and said width of said box-shaped housing is sufficient to extend across a substantial portion of the chest of a spectator upon the spectator suspending the box-shaped housing from the neck of the spectator.

3. The individual entertainment display kit according to claim 2, wherein:

each of said two light sources has a height and width, wherein said height is substantially greater than said width;

said height of each of said two light sources is substantially equivalent to said height of said box-shaped housing;

said width of each of said two light sources is substantially less than said width of said box-shaped housing; and said two light sources together are configured to cover a substantial portion of said width of said box-shaped housing.

4. The individual entertainment display kit according to claim 3, wherein:

said strobe light has a height and width, wherein said height is substantially equivalent to said width;

said width of said strobe light is substantially equivalent to said width of each of said two light sources;

said strobe light is disposed between said two light sources; and said strobe light and said two light sources together are configured and disposed to extend across substantially the entire width of said box-shaped housing.

5. The individual entertainment display kit according to claim 4, wherein said manually-operated user interface comprises a handheld control device detachably connected by a cable to said box-shaped housing.

6. The individual entertainment display kit according to claim 5, wherein:

said computer control unit is configured to store audio signals comprising at least one of music, sound effects, and voice recordings, to be emitted by said loudspeaker;

said entertainment display device comprises a microphone configured and disposed to receive audio signals; and said computer control unit is configured to store audio signals received by said microphone.

7. The individual entertainment display kit according to claim 6, wherein:

said computer control unit is configured to immediately transfer vocal audio signals received by said microphone to said loudspeaker to permit a spectator to utilize said entertainment display device as a voice sound amplifier;

said microphone is connected to said box-shaped housing by a bendable wire support structure;

said wire support structure is configured and disposed to permit positioning of said microphone a distance away from said loudspeaker to minimize feedback and adjacent the mouth of a spectator to promote accurate reception of vocal audio signals from the spectator; and said computer control unit is configured to synchronize the activation of at least one of: said strobe light and said light sources with the emission of audio signals by said loudspeaker.

8. An individual entertainment display kit to be used by a spectator at a spectator event to produce an entertainment presentation, said individual entertainment display kit comprising:

a plurality of color filter elements;

an entertainment display device comprising:

a box-shaped housing;

two light sources each being configured to emit light in an entertainment presentation;

two holding arrangements, each being disposed immediately adjacent a corresponding one of said light sources;

each of said holding arrangements being configured to receive and hold one of said color filter elements to permit a spectator to alter the color of the light emitted by at least one of said light sources by insertion of one of said color filter elements into a corresponding holding arrangement;

a strobe light being configured to emit flashes of light in an entertainment presentation;

an audio loudspeaker being configured to emit sound in an entertainment presentation;

a computer control unit being operatively connected to said light sources, said strobe light, and said audio loudspeaker and being configured to control the operation of said light sources, said strobe light, and said audio loudspeaker in an entertainment presentation; and a power source being configured and disposed to supply power to said light source, said strobe light, said audio loudspeaker, said user interface, and said control unit.

9. The individual entertainment display kit according to claim 8, wherein:

said entertainment device comprises a manually-operated user interface configured to permit a spectator to input operating instructions to said computer control unit to control the operation of said light sources, said strobe light, and said audio loudspeaker in an entertainment presentation; and said entertainment display kit comprises a support strap connected to said box-shaped housing to permit suspension of said box-shaped housing from a neck of a spectator.

10. The individual entertainment display kit according to claim 9, wherein:

said box-shaped housing has a height, width, and depth, wherein said height is substantially greater than said depth, and said width is substantially greater than said height; and said width of said box-shaped housing is sufficient to extend across a substantial portion of the chest of a spectator upon the spectator suspending the box-shaped housing from the neck of the spectator.

11. The individual entertainment display kit according to claim 10, wherein:

each of said two light sources has a height and width, wherein said height is substantially greater than said width;

said height of each of said two light sources is substantially equivalent to said height of said box-shaped housing;

said width of each of said two light sources is substantially less than said width of said box-shaped housing; and said two light sources together are configured to cover a substantial portion of said width of said box-shaped housing.

12. The individual entertainment display kit according to claim 11, wherein:

said strobe light has a height and width, wherein said height is substantially equivalent to said width;

said width of said strobe light is substantially equivalent to said width of each of said two light sources;

said strobe light is disposed between said two light sources; and said strobe light and said two light sources together are configured and disposed to extend across substantially the entire width of said box-shaped housing.

13. The individual entertainment display kit according to claim 12, wherein:

said manually-operated user interface comprises a hand-held control device detachably connected by a cable to said box-shaped housing;

said computer control unit is configured to store audio signals comprising at least one of music, sound effects, and voice recordings, to be emitted by said loudspeaker;

said entertainment display device comprises a microphone configured and disposed to receive audio signals; and said computer control unit is configured to store audio signals received by said microphone.

14. The individual entertainment display kit according to claim 13, wherein:

said computer control unit is configured to immediately transfer vocal audio signals received by said microphone to said loudspeaker to permit a spectator to utilize said entertainment display device as a voice sound amplifier;

said microphone is connected to said box-shaped housing by a bendable wire support structure;

said wire support structure is configured and disposed to permit positioning of said microphone a distance away from said loudspeaker to minimize feedback and adjacent the mouth of a spectator to promote accurate reception of vocal audio signals from the spectator; and said computer control unit is configured to synchronize the activation of at least one of: said strobe light and said light sources with the emission of audio signals by said loudspeaker.

15. The individual entertainment display kit according to claim 8, wherein:

said entertainment display device comprises a manually-operated user interface configured to permit a spectator to input operating instructions to said computer control unit to control the operation of said light sources, said strobe light, and said audio loudspeaker in an entertainment presentation; and said entertainment display device comprises a wireless receiver configured to receive and transmit operating instructions to said computer control unit to control the operation of said light sources, said strobe light, and said audio loudspeaker in a coordinated entertainment presentation with a plurality of other entertainment display devices.

16. The individual entertainment display kit according to claim 15, wherein:

each of said two light sources has a height and width, wherein said height is substantially greater than said width;

said height of each of said two light sources is substantially equivalent to said height of said box-shaped housing;

said width of each of said two light sources is substantially less than said width of said box-shaped housing; and said two light sources together are configured to cover a substantial portion of said width of said box-shaped housing.

17. The individual entertainment display kit according to claim 16, wherein:

said strobe light has a height and width, wherein said height is substantially equivalent to said width;

said width of said strobe light is substantially equivalent to said width of each of said two light sources;

said strobe light is disposed between said two light sources; and said strobe light and said two light sources together are configured and disposed to extend across substantially the entire width of said box-shaped housing.

18. The individual entertainment display kit according to claim 17, wherein:

said entertainment display device is configured to be fastened to at least one of:

a cap or hat;

a handle; and a necklace or a chain suspended on another part of the body of a spectator;

at least one of said two light sources comprises an LCD or plasma monitor;

said manually-operated user interface comprises a hand-held control device detachably connected by a cable to said box-shaped housing;

said computer control unit is configured to store audio signals comprising at least one of music, sound effects, and voice recordings, to be emitted by said loudspeaker;

said entertainment display device comprises a microphone configured and disposed to receive audio signals; and said computer control unit is configured to store audio signals received by said microphone.

19. The individual entertainment display kit according to claim 18, wherein:

said computer control unit is configured to immediately transfer vocal audio signals received by said microphone to said loudspeaker to permit a spectator to utilize said entertainment display device as a voice sound amplifier;

said microphone is connected to said box-shaped housing by a bendable wire support structure;

said wire support structure is configured and disposed to permit positioning of said microphone a distance away from said loudspeaker to minimize feedback and adjacent the mouth of a spectator to promote accurate reception of vocal audio signals from the spectator; and said computer control unit is configured to synchronize the activation of at least one of: said strobe light and said light sources with the emission of audio signals by said loudspeaker.

20. The individual entertainment display kit according to claim 19, wherein:

said computer control unit is configured to store a plurality of stored audio signals and is configured to retrieve stored audio signals for playback independently of one another and in any desired sequence;

said computer control unit is configured to store a remote control address which is connected in a fixed and permanent manner to a location, said location comprising a seat or a standing place in an event location, and which is usable to locate said entertainment display device in an event location; and said entertainment display device comprises means for self-synchronization of said entertainment display device with other entertainment display devices, wherein said means are one of:

transmitter and receiver modules for radio or light or audio signals; and a radio clock module.

* * * * *